United States Patent
Kawakita

[11] Patent Number: 5,673,395
[45] Date of Patent: Sep. 30, 1997

[54] PROCESS FOR CONSTRUCTING COMPUTER NETWORK SYSTEM OF TENANT INTELLIGENT BUILDING

[76] Inventor: Jun Kawakita, 14-4, Shinohara-nishicho, Kohoku-ku, Yokohama-shi, Kanagawa-ken, Japan

[21] Appl. No.: 49,518

[22] Filed: Apr. 19, 1993

[51] Int. Cl.$^6$ .................................................. G06F 13/40
[52] U.S. Cl. .................................... 395/200.21; 359/119
[58] Field of Search ............................... 395/200, 200.21; 359/118, 144, 119, 120, 121; 350/96.2, 96.21; 385/53, 54, 55, 76, 92

[56] References Cited

U.S. PATENT DOCUMENTS

| | | | |
|---|---|---|---|
| 4,900,124 | 2/1990 | Lampert et al. | 350/96.21 |
| 5,011,257 | 4/1991 | Wettengel et al. | 350/96.2 |
| 5,078,467 | 1/1992 | Blomgren et al. | 385/56 |
| 5,127,067 | 6/1992 | Delcoco et al. | 385/24 |
| 5,189,541 | 2/1993 | Konishi | 359/119 |
| 5,301,303 | 4/1994 | Abraham et al. | 395/500 |

*Primary Examiner*—William M. Treat
*Attorney, Agent, or Firm*—Fay, Sharpe, Beall, Fagan, Minnich & McKee

[57] ABSTRACT

Computer network systems in optional tenant rooms in an intelligent building are connected collectively by means of optical fiber cables and an optical patch panel, thereby providing computer network systems of every tenants independent of each other and high in safety. Optical connectors 8 are respectively provided in a plurality of tenant rooms installed on the respective floors 7 of a tenant intelligent building incorporating therein enterprises different from one another, optical fiber cables having at least four cores are connected to the optical connectors 8, the cables in the respective tenant rooms on the respective floors are bundled and connected to an optical patch panel provided at an appropriate place in the building, and the optical fiber cables 12 from the tenant rooms can be connected to one another though the optical patch panel 16 by replacing patch cords, so that independent transmission medium systems 20 of the respective tenant are per formed. In accordance with the use conditions of the tenant floors in the building, the backbone system of a desirable block (tenant rooms) on desired floors can be easily constructed merely by replacing the patch cords on the optical patch panel.

7 Claims, 6 Drawing Sheets

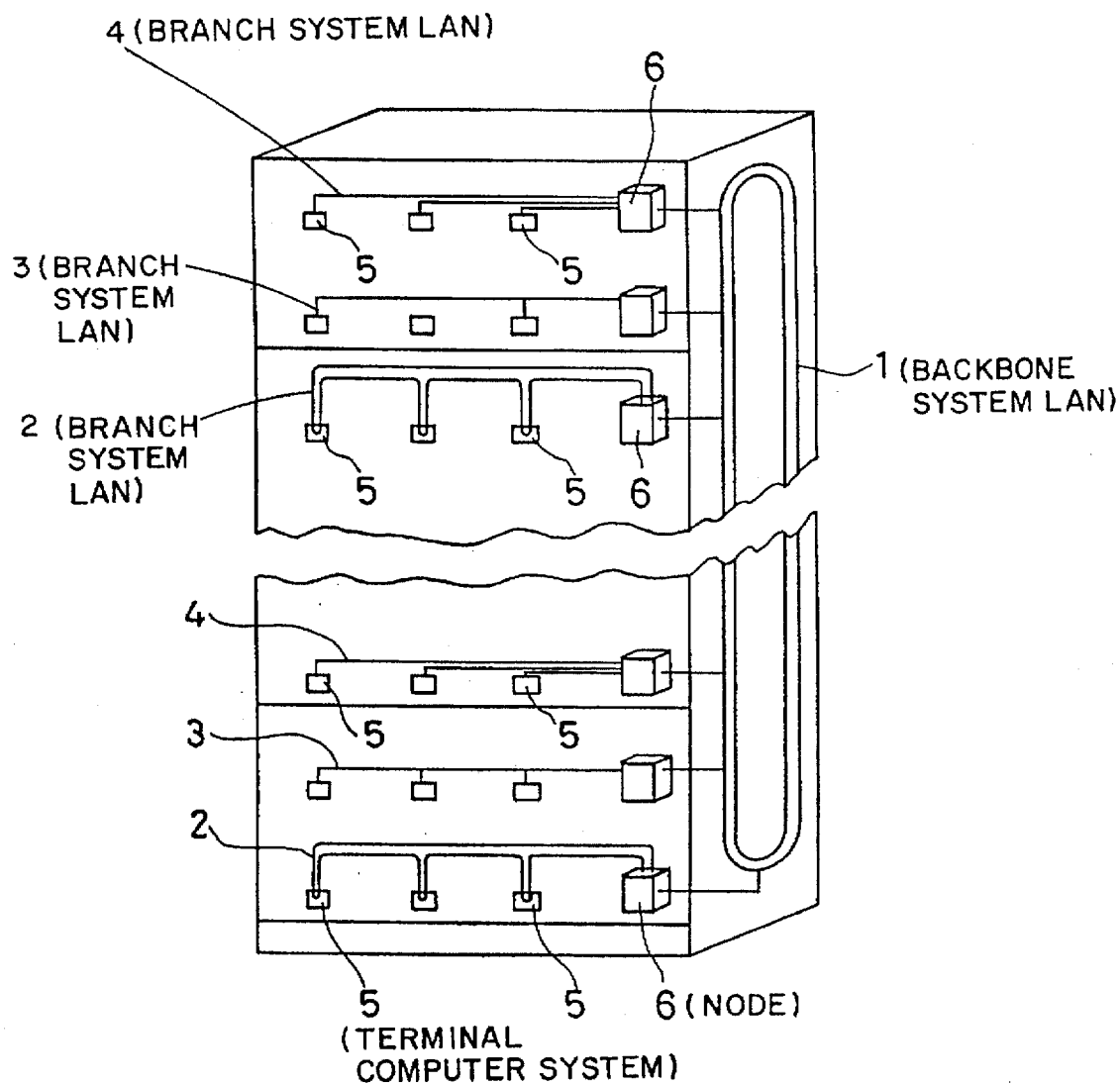

PROCESS FOR CONSTRUCTING COMPUTER NETWORK SYSTEM OF TENANT INTELLIGENT BUILDING

FIELD OF THE INVENTION

This invention relates to a process for constructing a computer network system in a multiple-tenant intelligent building, thereafter referred to as a tenant intelligent building, and more particularly to a process for constructing computer network systems for a tenant intelligent building having multiple tenant rooms on one or more floors, wherein computer network systems for associated rooms of the same tenant on the same or different floors can be easily connected, whereby independent computer network systems for each tenant is formed.

FIG. 6 is a conceptual view showing a conventional computer network system in an intelligent building, in which the conventional optical LAN (local area network) is utilized.

As shown in FIG. 6, the computer network system of an intelligent building consisted of a backbone system LAN 1 provided vertically in the building, various branch system LANs such as token ring LAN 2, CSMA/CD (Carrierwave Sensing Multiple Access/collision detecting) LAN 3, star LAN 4, and terminal computer systems 5 connected to the above-mentioned branch system LANs "Illustration Book For Connections Between Different Enterprises and LAN" supervised by Seiji UEHARA, page 18, 1989, issued by OHM Co. Japan). In this figure, numeral 6 indicates various nodes such as optical connectors, for connecting between the branch system LAN and the backbone system LAN.

However, in the above-described computer network system, when the intelligent building is an owner building, for example, and only the owner enterprise uses the whole system, the backbone system computer network may be single, and branch system networks may be respectively connected to the backbone network. However, when the rooms in the building are rent to be used as tenant rooms, only one backbone system LAN causes problems of safety or secret keeping. Accordingly, in the case of a tenant building, independent backbone systems for the respective enterprises or tenants should be unavoidably provided. Further, when the same tenant moves or increases the rooms in the same building, the computer network system for the tenant have to be changed or added each time, which causes a troublesome and expensive work. Further, even in the case of the owner building, when some rooms are supposed to be rented as tenant rooms, computer network systems should be constructed taking into consideration the occurance of such tenant rooms, whereby the intelligent building tends to be put under much restriction.

SUMMARY OF THE INVENTION

It is an object of the present invention to provide a process for constructing computer network systems for tenant intelligent building, wherein the above-described various problems of the conventional intelligent building are avoided, and respective computer systems of associated tenant rooms on the same or different floors are connected to one another optionally, whereby the computer network systems for every tenants are formed, respectively, and even when any movement or change of the tenants takes place, flexible countermeasures can be taken to construct the respective computer network systems of the tenants easily.

The present invention includes providing optical connectors for the computer network systems in tenant rooms installed on the respective floors in a tenant intelligent building. Optical, fiber cables having at least four cores are connected to the optical connectors. The, optical fiber cables for the respective tenant rooms are bundled on the respective floors and are connected through drop cables to an optical patch panel provided in a predetermined room in the building. The, optical patch panel is arranged in such a manner that the optical fiber cables of each tenant room are connected to one another to form independent networks for each tenant.

In the present invention, when one floor is divided into a plurality of blocks each having tenant rooms, optical connectors for the respective blocks may be placed in the block or may be collectively installed in pipe spaces on the respective floors.

In this invention, the predetermined room may be disposed at an optional room in the building, e.g. in a basement, and computers having an additional value for performing various services can be connected to the transmission medium of the above-described blocks or tenant rooms through an optical patch panel provided in this predetermined room.

Furthermore, individual computers to be used by the respective tenants may be stored in a rental machine room provided in the vicinity of the predetermined room, which computers being connected to the transmission medium of the above tenant rooms through the optical patch panel in the above predetermined room. Incidentally, the term "tenants" referred to in the present invention, means not only enterprises different from one another, but also different sections in the same enterprise. The tenant rents one or more unit blocks each consisting of tenant rooms in the building, wherein a branch system LAN as a transmission medium system is formed every unit block.

As the transmission medium systems utilized in the invention, besides one which forms a transmission ring, one using a point-to-point connection can be utilized. Specifically, FDDI (Fiber Distributed Data Interface), Ether net optical repeater link, and ATM (Asynchronous Transfer Mode) are utilized.

For the optical fiber cable used for the transmission medium system, one having at least four cores is used. However, a cable having six or more cores is desirable in the case where an external communication circuit is directly led into the tenant room, or in the case where a preliminary wiring is provided by way of precaution against troubles.

The above-described predetermined room, in which the optical patch panel is provided, may be disposed at any floor in the building, besides a basement. Since the optical patch panel corresponds to the heart portion of the transmission medium systems for the respective tenant, safeguard of security therefor is required. Further, in the predetermined room, besides the facilities for the safeguard, there may be provided computers for performing various services having an additional value such as utilization of the common facilities, utilization of external communication services, etc. The transmission medium systems for the tenant rooms are connected to the computers so as to provide the value-added services as desired by the tenants.

Furthermore, in this predetermined room or in the vicinity thereof, there may be provided a rental machine room, in which rental computers for the respective tenants are provided, so that the transmission medium systems of the tenants can be connected to these computers through the above optical patch panel.

These computers for the value-added services and the individual computers for each tenant are preferably installed in the vicinity of the optical patch panel in the predetermined room, whereby, particularly in the tenant building, there is no need for constructing an environment for installation of these computers for the tenants, so that the utilization costs such as installation costs and room rent can be reduced. Furthermore, the utilization costs for the various additional services which are collectively available in the building is inexpensive as compared with the case where such services are individually ordered to the outside firm by the respective tenants.

BRIEF DESCRIPTION OF THE DRAWINGS

FIG. 6 is a conceptual view showing a conventional computer network system in the intelligent building, in which the conventional optical LAN is utilized.

DETAILED DESCRIPTION OF THE PREFERRED EMBODIMENTS

1: Backbone system LAN,
2-4: branch system LAN,
5: terminal computer system,
6: nodes of various types,
7: floor,
8: optical connector,
9: wiring components for branch system LAN,
10: FDDI node,
12: group of optical fiber cables,
14: network safeguard room,
16: optical patch panel (cabinet type),
18: computer for added value services,
19: computers for individual tenants,
20: transmission ring,
21: rental machine room,
22: FDDI node,
23: branch system LAN in rental machine room,
24,25: Ether net optical repeater.

Figure 1:
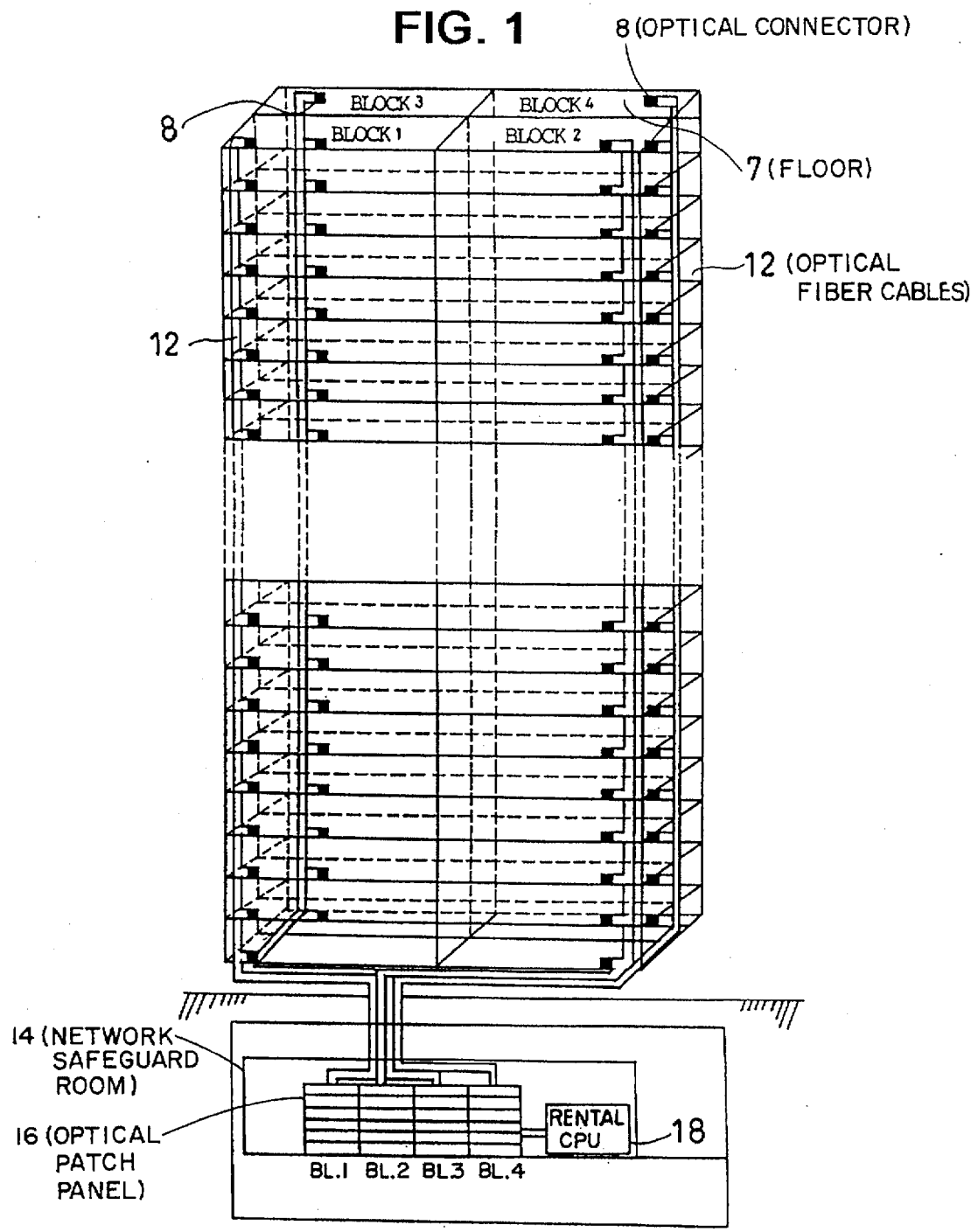
FIG. 1 is an explanatory view showing a process for constructing a computer network system in a tenant intelligent building depicting an utilization of the invention.

In FIG. 1, the respective floors 7 of the tenant intelligent building are divided into blocks 1, 2, 3 and 4, for example, each block consisting of a group of rooms, and a single or multiple tenants would rent to utilize these blocks. In this case, one block is the lowest unit for a tenant. In each block, there are provided an optical connector 8, an FDDI node 10 and a wiring component 9 for a branch system LAN, as shown in FIG. 2.

Optical fiber cables 12 having at least four cores, which are connected to the optical connectors 8 from the FDDI nodes 10 in the respecive blocks are bundled together, suspended downwardly through the floors of the building, gathered as respective cable groups of the blocks 1, 2, 3 and 4, and connected to the corresponding terminal ends of an optical patch panel (cabinet type) 16 by means of drop cables or patch cords. This optical patch panel is provided in a safeguarded room in a basement. In this optical patch panel 16, the optical fiber cables from the respective blocks on the respective floors are suspended to the optical patch panel through which optical fiber cables of optical blocks are connected to one another by arranging the patch cords of the corresponding blocks on the optical patch panel, so that a transmission ring connecting these blocks (tenant rooms) can be formed. The reason the optical patch panel is installed in the safeguarded room is that the optical patch panel and the patching conditions should be safeguarded against unauthorized access.

Figure 2:
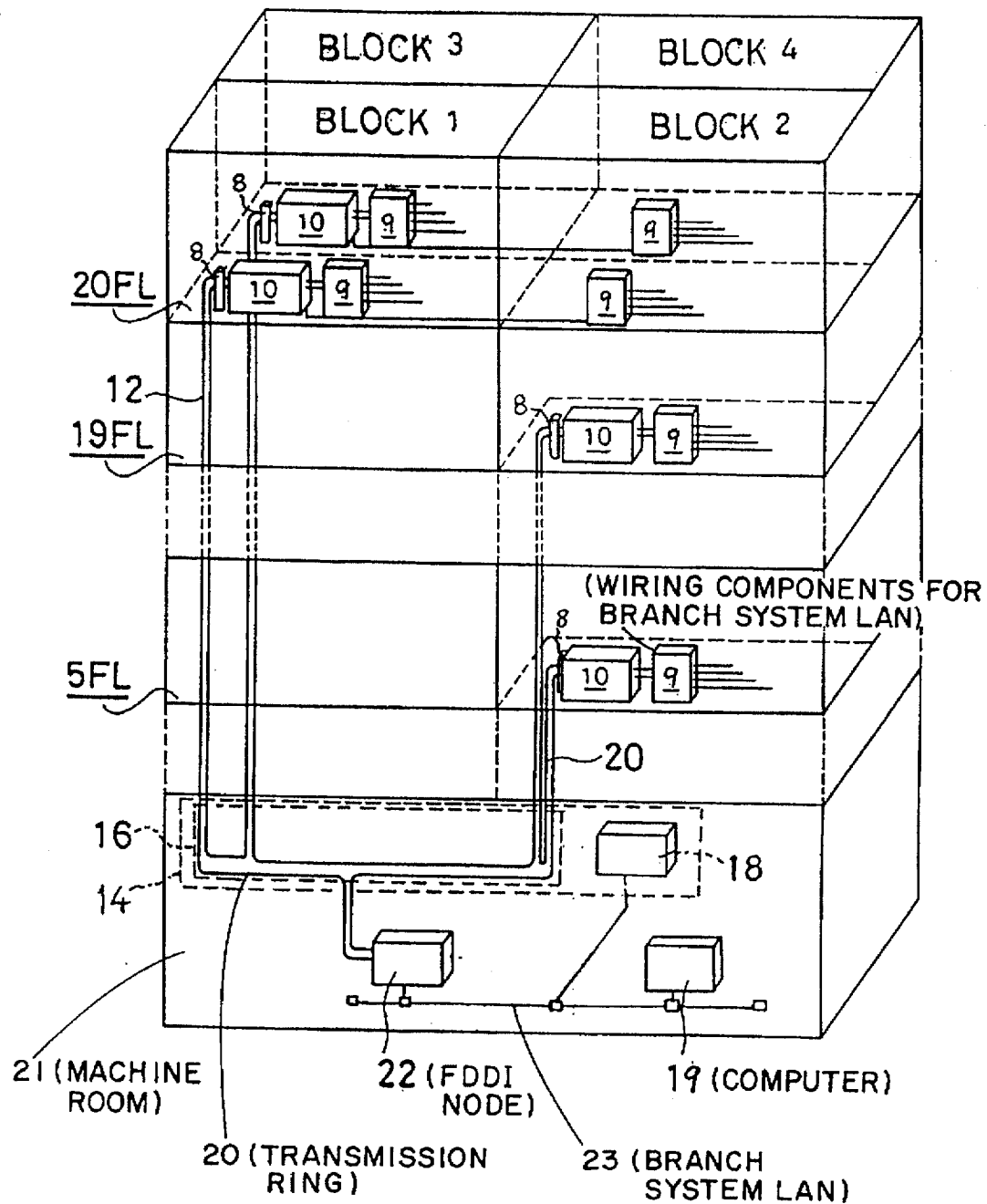
FIG. 2 is an explanatory view showing a process for forming an independent computer network system by connecting computer systems on the different floors of the same tenant in FIG. 1, wherein each computer system of tenant blocks on each floor are connected by optical fiber cables through an optical patch panel, whereby individual transmission rings of the tenant are formed.

When a certain tenant rents and utilizes block 2 on the 5th floor, blocks 1-4 on the 20th floor and block 2 on the 19th floor in the intelligent building as shown in FIG. 2, then, optical fiber cables 12 in these blocks are connected to one another by replacing the respective patch cords on the optical patch panel 16 so as to form a transmission ring 20. In this case, although FDDI nodes 10 of the blocks 1 and 3 on the 20th floor are served as those in the blocks 2 and 4 on the same floor, the blocks 2 and 4 may be connected to the optical fiber cables through other FDDI nodes, independently, similarly to the blocks 1 and 3.

As has been described, the optical fiber cables of the respective blocks on the respective floors are gathered together and connected to one another through the optical patch panel at the basement of the building, for example, whereby optical fiber cables of optional blocks can be connected to one another, so that the transmission ring 20 of the computer systems of optional blocks of the same tenant can be easily formed.

Various products used to realize the benefits of this invention will be described below.

The transmission medium used in the invention is not to be limited in particular, as far as the medium using the optical fiber cables. A multi-mode graded type optical fiber cable, a single mode type optical fiber cable, etc. can be utilized. Among these optical fiber cables, those for combined use of long and short waves are preferable.

As the specification of the backbone system network, the following FDDI is preferably employed, Backbone transmission speed: 100 Mbps
Codifying mode: 4B5B+NRZ1 code
Transmission/modulation mode: Base band
Protocol: Append-token-protocol As a practical construction process, optical fiber cables are installed first in each block, and a basment, a hall, a conference room, an entrance, a lobby etc. as necessary. Subsequently, connection of the optical fiber cables is carried out between the respective optical connectors of the blocks and the corresponding terminal ends of the optical fiber patch panel. To the optical fiber patch panel is attached patch cords or drop cables for connecting the fiber cables from the respective blocks or rooms to one another or to MIC connector of FDDI node of another network system, optionally. The connection of the optical connector to an FDDI node and the like, which are specified by a tenant, is prepared.

Further, for the respective blocks, patch down block for a telephone system and a data system, and information plug sockets are mounted as necessary. Twist pair cables are wired from the respective patch down blocks to the information plug sockets. Furthermore, a rental machine room and a room for installation of computers for value-added services may be constructed adjacent to the cabinet type optical fiber patch panel in combination with a safeguard system therefor.

Then, when the tenants rent the blocks of the building, the optical connectors of the respective blocks are connected to an FDDI node and the like which are specified by the respective tenants through optical fiber cables. Furthermore, individual computers for the respective tenants are installed in the rental machine room.

Subsequently, as a specification of a branch system network, twist pair cables using four pairs of two core twisted lines may be used as the transmission medium, for example. In addition, as other specifications, the following ones may be used, for example. These specifications are based on IEEE 802. 3, 10 BASE T Standard.

Medium access system: CSMA/CD (Ether net)
Branch transmission speed: 10 Mbps
The largest number of workstations: 1024
Communication distance: 100 m
Codifying mode: Manchester codifying
Transmission/modulation mode: Base band
Topology: Star mode bus Other specifications may be selected in accordance with the specifications of the computer components utilized.

As to the wiring of the secondary LAN system as the branch system, the primary backbone system is first connected to the branch system by means of optical connectors having four or more cores and connecting components described below provided for the respective blocks. As the components for connecting the backbone system to the branch system, a router, a brouter, a concentrator, a HUB, a repeater etc., as optionally required by the respective tenants, may be used. The backbone system is connected by these connecting components, to patch down blocks of the branch system. These patch down blocks are wired to connect to the information plug sockets in the tenant rooms. Further, twist pair cables may be used to connect the information plug sockets to the respective terminals of computers through suitable adapters. Further, the optical fiber patch panel in the network safeguarded room is arranged by patching drop cables or patch cords in accordance with the situation of the tenant blocks.

Figure 3:
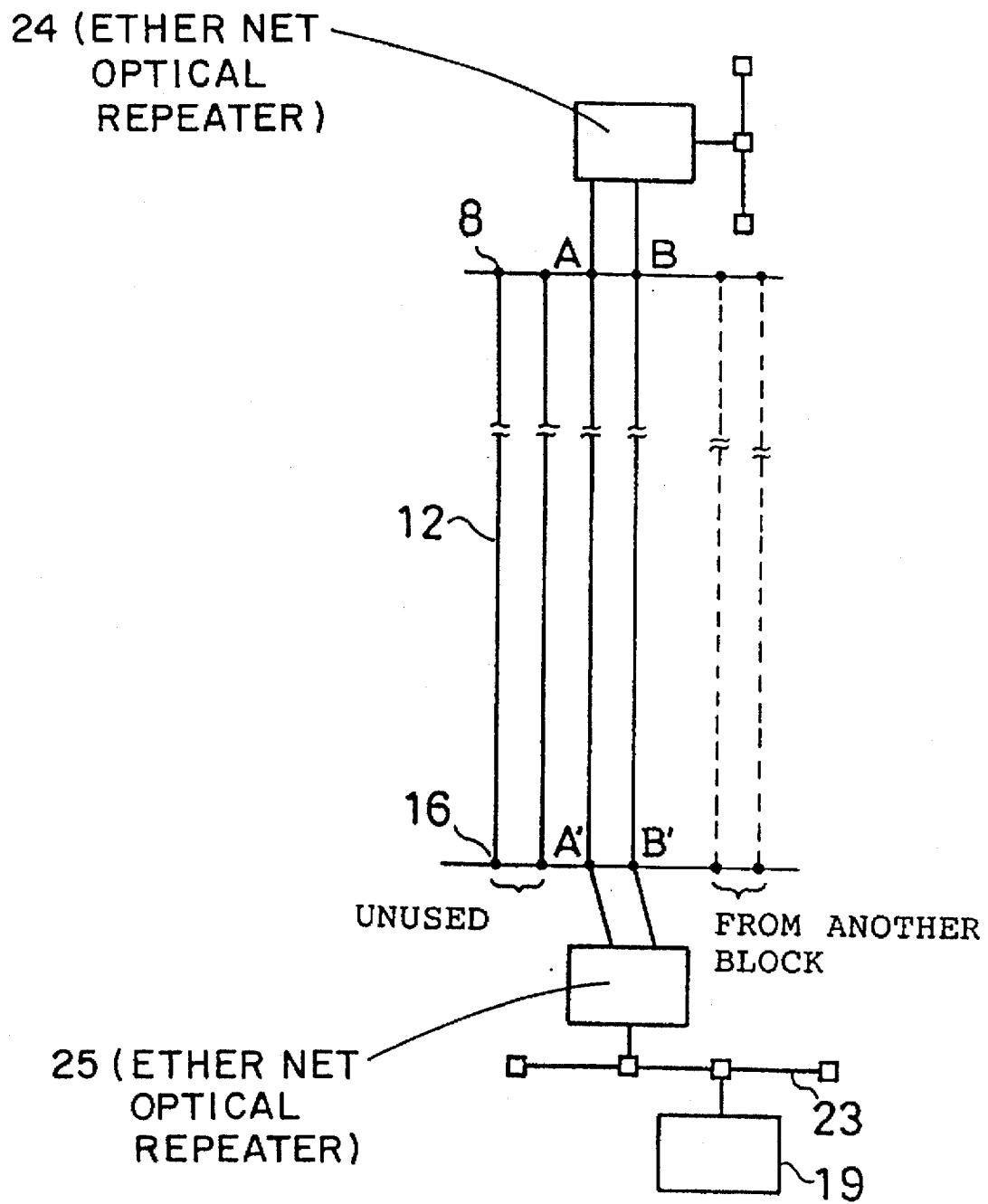
FIG. 3 is a conceptual view showing a process for connecting optical cables constituting a transmission medium system through a point-to-point connection (Ethernet optical repeater link and the like)

FIG. 3 is a conceptual view showing a process of connecting optical fiber cables in the case where a transmission medium system is formed by an inexpensive point-to-point connection without using FDDI and the like. In this case, A and A', and B and B' are connected to each other as point-to-point, and no ring is formed.

Additionally, while the wireless LAN technology is under development as a component of the branch system LAN, since the wireless LAN is only applied to the computer network systems within a single floor, the invention is also applicable to the systems connecting between the wireless components and FDDI nodes or between the wireless components and the optical connector of the respective blocks.

Next, an example in the case where a computer for value-added services and/or an individual computer of a tenant are included in the system of the present invention will be described with reference to the accompanying drawing.

Figure 4:
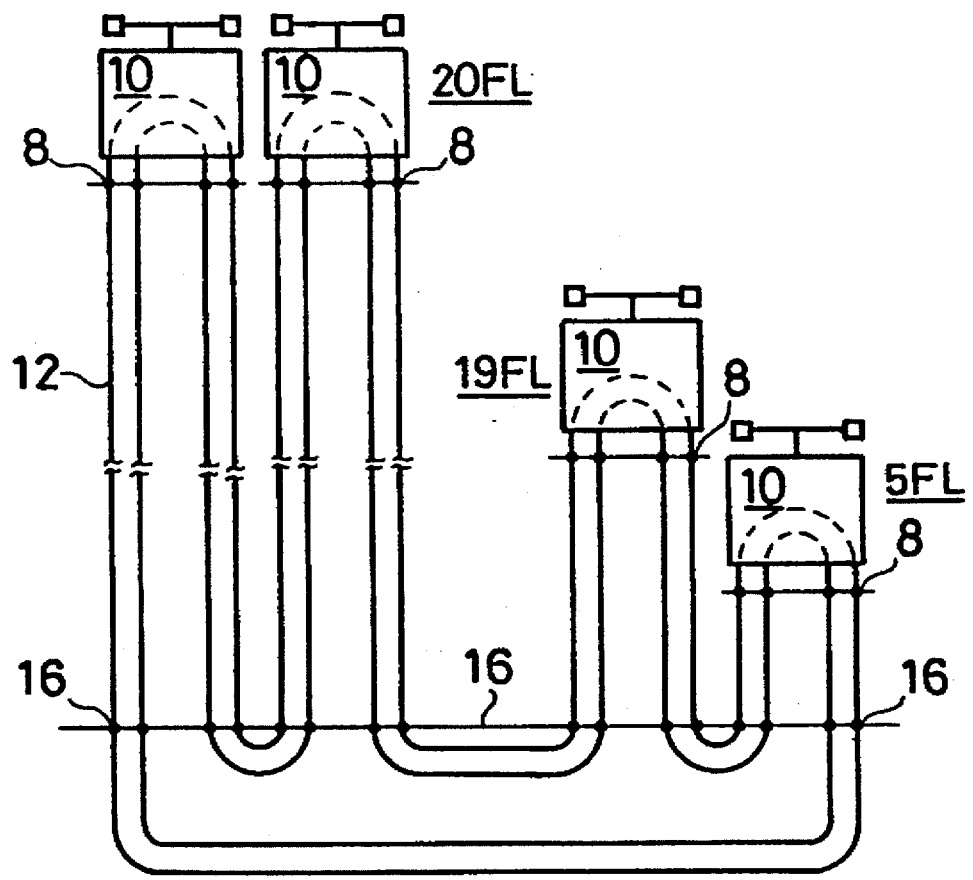
FIG. 4 is a conceptual view showing an example of connecting (patching) optical fiber cables in the example shown in FIG. 2, when computers for the value-added services are not utilized.
Figure 5:
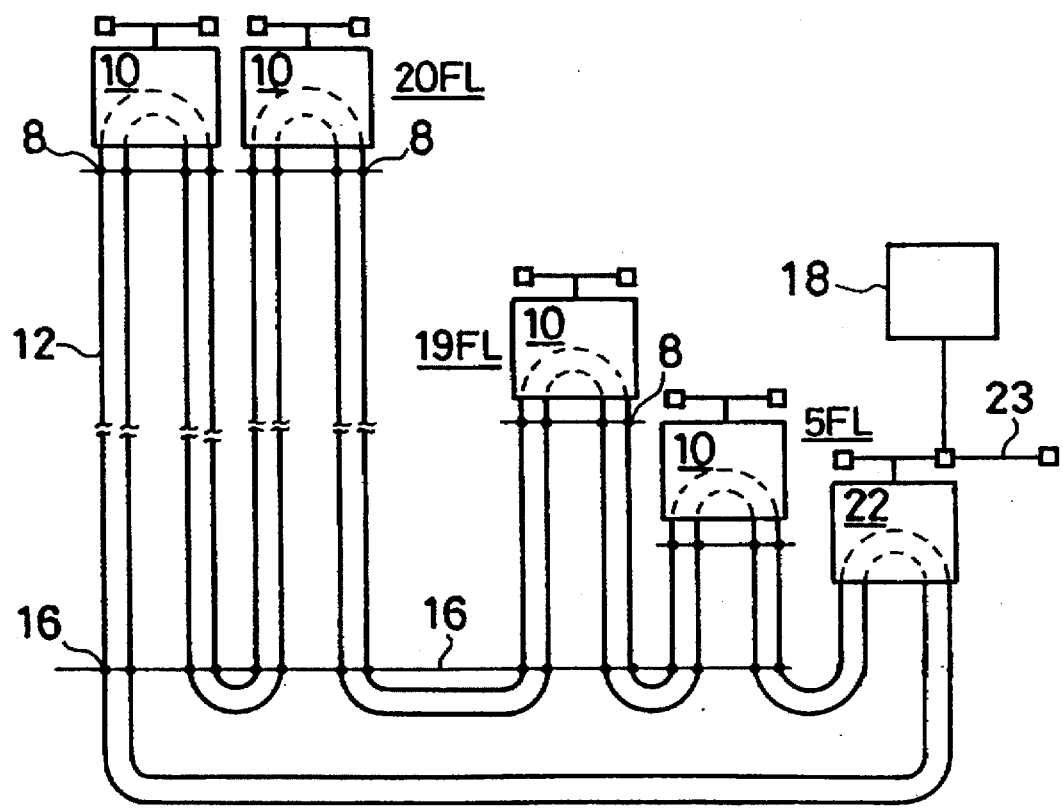
FIG. 5 is a conceptual view showing an example of connecting (patching) optical fiber cables in the example shown in FIG. 2, when the computers for the value-added services are utilized.

FIG. 4 is a conceptual view showing a method of connecting (or patching) the optical fiber cables, when the additional services are not applied as in FIG. 2. FIG. 5 is a conceptual view showing an example of a method of connecting the optical fiber cables when an additional service computer 18 and a rental machine room 23 are utilized.

In FIG. 5, optical fiber cable 12 for receiving value-added services is connected to a branch system LAN 23 specially used for the tenants through the optical patch panel 16. That is, the branch system LAN 23 provided in a rental machine room 21 (FIG. 2), is connected to the optical fiber cables 12 through an FDDI node 22 (similar in function to an FDDI node 10 in FIG. 2) by patching on the optical patch panel 16, so that various services can be received as in (1)–(4) shown below.

(1) Utilization of Rental Machine Room

When a rental machine room in which a system for maintaining and controlling computers is provided, is rented to tenants, components associated with individual computers of the tenants are installed. A plurality of computers of different tenants are maintained and controlled collectively in the rental machine room, so that running costs such as air conditioning and the like can be reduced, and the personnel required for maintenance of the components can be reduced in number.

Subsequently, host computers of the respective tenants are connected to the independent backbone FDDI rings and the like for the respective tenants through the branch system LAN in the rental machine room, the FDDI nodes etc. The terminals of the computers and the workstations, which are installed on the ordinary tenant floors are connected to the backbone FDDI rings through the branch system LAN, FDDI nodes, etc., so that it becomes possible to communicate between the host computers and the terminals of computers on tenant floors.

(2) Modem Pool Service

An interface portion of a telephone circuit (modem, time-division multiplexer, etc.) is not installed on the ordinary tenant blocks, but installed in the rental machine room as described in the above (1), and connected to the branch system LAN through a bridge, a communication server etc. This arrangement eliminates the necessity of bringing the troublesome modem, etc. into the environment of the office, thereby promoting the effective utilization of the space. Furthermore, through the computer terminals and the workstations on the ordinary tenant floors, it becomes possible to communicate with the remote LAN and computers over a bridge according to the standard technique of LAN, and to utilize a external data base through the communication server.

(3) Common Service

In the tenant intelligent buildings, there are common facilities such as a hall and a conference room under a reservation system, etc. In a network safeguard room as being one of the common facilities of the building, there is provided a computer for the additional value servicecapable of performing the common services such as checking of reservations for the hall and the conference room, proposal of reservation, etc. The branch system LAN installed for the tenants in the rental machine room can be connected to this computer for the additional value services through communication cables and communication nodes, so that the computer terminals and the workstations on the ordinary tenant floors can be communicated therewith through the standard technique of LAN to utilize the additional services.

(4) External Data Base Service

All the tenants in the building can conclude a contract with an external data base (DB) vendor (for example, Nikkei Telecom (service mark of Nippon Keizai Shinbunsha, Japan) and the like), and a gate way machine of the external data base and a modem pool for specialized use can be installed in a network safeguard room. By performing connection similar to (3), it is possible to utilize the DB through the terminals and workstations of the tenant rooms. Thus, the tenants can utilize the external data base easily by an inexpensive simple proposal step, owing to the contract by the whole building.

According to the present invention, a flexible backbone system with various optional blocks (tenant rooms) on optional floors can be easily constructed merely by patching drop cables, that is, by replacing patch cords on the optical patch panel as shown in the embodiment, so that, even if increase or decrease of specific blocks or changes in tenants occur, transmission medium systems for the computer network systems for the respective tenants can be easily accomplished by the replacement of patch cords. Furthermore, since the transmission medium systems are constructed independently of one another, and the control of the backbone network systems of the respective tenants is performed in the safeguard room, the data security between the tenants can be assured. Furthermore, it becomes possible to offer various services to the respective tenants as an attractive feature of the building, Further, construction or destruction of the computer network systems for the tenants, which tend to occur when the tenants move into or out of the building, can be eliminated, so that the damage to the building can be avoided, as well as preventing waste materials from generating by the destruction of the computer network.

What is claimed is:

1. A computer network power distribution system for supplying a plurality of distinct computer networks, the system comprising:

a structure having at least ten distinct levels, each of said levels divided into at least four blocks;

a plurality of optical connectors, at least one optical connector of the plurality associated with each of the blocks;

a plurality of optical fiber cables having at least four cores, respective ones of the plurality of optical fiber cables connected to each of the optical connectors;

a plurality of drop cables for connecting bundles of the optical fiber cables on a same level with bundles of the optical fiber cables on other levels of the structure; and, a central optical patch panel providing connections for each of the plurality of optical fiber cables, the optical patch panel constructed for the optical fiber cables to be reconfigurably interconnected to one another to supply the plurality of distinct computer networks.

2. The system according to claim 1 having a transmission speed of substantially 100 Mbps.

3. The system according to claim 1 having a codifying mode of 4B5B+NRZ1 code.

4. The system according to claim 1 having a base band transmission/modulation mode.

5. The system according to claim 1 having append-token protocol.

6. The system according to claim 1 wherein the optical patch panel is constructed to reconfigurably connect at least 40 optical fiber cables.

7. The system according to claim 1 wherein the optical patch panel is constructed to reconfigurably connect at least 60 optical fiber cables.

* * * * *